(12) United States Patent
Ellringmann et al.

(10) Patent No.: US 7,705,080 B2
(45) Date of Patent: Apr. 27, 2010

(54) REPULPABLE ADHESIVES

(75) Inventors: Kai Ellringmann, Hamburg (DE);
Stefan Wulf, Mönchengladbach (DE);
Philipp Preuβ, Neuenhaus (DE)

(73) Assignee: tesa SE, Hamburg (DE)

( * ) Notice: Subject to any disclaimer, the term of this patent is extended or adjusted under 35 U.S.C. 154(b) by 109 days.

(21) Appl. No.: 11/952,414

(22) Filed: Dec. 7, 2007

(65) Prior Publication Data

US 2008/0153951 A1    Jun. 26, 2008

(30) Foreign Application Priority Data

Dec. 20, 2006 (DE) .................. 10 2006 060 980
Sep. 4, 2007 (DE) .................. 10 2007 041 734

(51) Int. Cl.
*C08K 5/521* (2006.01)
*C08K 3/32* (2006.01)
*C08K 5/5333* (2006.01)

(52) U.S. Cl. ................. 524/416; 524/123; 524/127; 524/130; 524/140; 524/414

(58) Field of Classification Search ................. 524/138, 524/140, 288, 445, 450, 123, 127, 130, 414, 524/416

See application file for complete search history.

(56) References Cited

U.S. PATENT DOCUMENTS

| 5,053,452 | A | * | 10/1991 | Spada et al. | 524/707 |
| 5,460,880 | A | * | 10/1995 | Patnode et al. | 428/354 |
| 7,175,853 | B1 | * | 2/2007 | Bracht | 424/449 |
| 7,524,910 | B2 | * | 4/2009 | Jiang et al. | 526/348 |
| 2006/0279922 | A1 | * | 12/2006 | Cho et al. | 361/683 |
| 2007/0141125 | A1 | * | 6/2007 | Bourdelais et al. | 424/443 |

OTHER PUBLICATIONS

"TAPPI UM-213 vs. the PTS Disintegrator Method"; TAPPI useful Methods 213, TAPPI 1991, ISBN 0898522064.

* cited by examiner

*Primary Examiner*—Peter Szekely
(74) *Attorney, Agent, or Firm*—Norris McLaughlin & Marcus PA

(57) ABSTRACT

The invention relates to an adhesive according to a conventional formulation, comprising additives capable of binding metal ions in the sense of chemical interactions, electrochemical interactions and/or physical interactions.

6 Claims, No Drawings

REPULPABLE ADHESIVES

The invention relates to repulpable adhesives intended more particularly for adhesive bonding to filler-containing materials.

One established method of offering repulpable adhesives lies in the preparation of (meth)acrylic acid polymers or acrylate copolymers comprising acrylic acid and at least one acrylate and/or methacrylate comonomer, such as alkyl acrylate, alkyl methacrylate, 2-ethoxyethyl methacrylates, 2-ethoxyethyl acrylate, hydroxyethyl methacrylate, ethylhexyl acrylate, butyl acrylate, isooctyl acrylate or the like. Where appropriate, the polymer may also include other, free-radically copolymerizable comonomers such as vinyl-caprolactam, vinyl acetate or the like.

This base polymer can be and is typically blended with resins and/or plasticizers in order to allow tailoring of the adhesive properties of the resulting (pressure-sensitive) adhesive. The components added are ideally water-soluble or water-dispersible, and may be not only of low molecular mass but also of high molecular mass kind.

The rheological profile of the adhesive is set by controlled crosslinking of the base polymer. Employed in this context are not only crosslinking reagents with a covalent action (isocyanates, epoxides, hydrazines, amines) but also crosslinking reagents with an ionic action [aluminium-(III), thallium-(IV), cerium-(IV)].

In contact with filler-containing papers, however, repulpable (pressure-sensitive) adhesives prepared in this way, whose principal application lies in products for the papermaking and paper-processing industries, frequently exhibit a significant drop in their adhesive properties, which can go as far as the complete loss of bond strength and tack. Filler-containing substrates, more particularly papers, may give off polyvalent metal ions as a result of ageing processes or external influences. A problem arises in particular through the calcium ions that are frequently present in the paper, or in substances with which the paper has been treated, since calcium is a filler and admixture in coating slips that is commonplace in the paper industry and whose use in that industry is on the increase.

The loss of properties on the part of the (pressure-sensitive) adhesive can be attributed in particular to a migration of the metal ions into the adhesive. The carboxyl-containing and/or acid-containing copolymers, with their controlled crosslinking, may in this way undergo uncontrolled post-crosslinking to beyond the desired extent. This post-crosslinking leads to an adverse effect on the rheological profile, such as to cause a massive increase in the cohesion and, in tandem with this, a reduction in the tack, which in the worst-case scenario goes as far as the complete loss of bond strength and tack.

For application in the paper-processing industry in particular, as for example in connection with flying splice, therefore, a strict profile of requirements is imposed on the adhesive tapes that are to be used. In the processing of flat web material, more particularly of paper, splicing on the fly is a common method of replacing an old reel that is almost fully unwound with a new reel, without having to stop the high-speed machines in order to accomplish this. Flying splices of this kind are frequently carried out using pressure-sensitive adhesive tapes to join the end of the old web to the start of the new web. Accordingly these adhesive tapes must—over the entire duration of the application—possess a high tack, effective cohesion, and good repulpability [the capacity to be introduced into the pulp, in other words the paper or fibre slurry suspended or dissolved in water, in the reprocessing of (waste) paper; not automatically synonymous with "water solubility"].

It is an object of the invention to offer an adhesive which exhibits increased stability in terms of its adhesive and/or rheological properties in the context of adhesive bonds to filler-containing materials.

It has been possible to achieve this object, surprisingly, through the addition of suitable additives to adhesives, more particularly acid-containing adhesives, preferably pressure-sensitive adhesives. Typically it has been possible to use (pressure-sensitive) adhesives whose base composition (i.e. excluding the additives) was conventional.

In accordance with the invention, additives are added which are capable of binding, and hence trapping, metal ions, more particularly alkaline earth metal ions, especially calcium(II) ions and/or magnesium(II) ions. Binding in the sense of this specification encompasses chemical interactions, electrochemical interactions and physical interactions (e.g. electrostatic interactions) between the additives and the aforementioned ions, and more particularly those interactions which thermodynamically hinder the reverse reaction (the "re-dissolution" of the bond).

The additives added are selected with particular preference from the group of chemical compounds which form salts of low solubility with metal ions, more particularly with alkaline earth metal ions, especially with calcium(II) ions and/or with magnesium(II) ions; from the group of the chemical compounds which complex the abovementioned ions; and/or from the group of the substances and chemical compounds which physically and/or chemically trap—in particular, spatially enclose—the aforementioned ions.

Additives which have emerged as being particularly suitable in accordance with the invention are those which are employed more particularly in the laundry detergent industry to control water hardness, hence especially water hardness reducing additives, particularly those additives capable of binding metal ions, more particularly alkaline earth metal ions, in the form of salts of low solubility.

Particularly for the application of the adhesive for adhesive bonding to papers, which typically have a more or less high level of calcium(2+) ions, advantageous additives are those apt to "deactivate" precisely these $Ca^{2+}$ ions.

Particular suitability is possessed, for example, by chelating agents of low and high molecular mass, preferably the respectively deprotonated anions (more particularly in the form of their sodium salts) of ethylenediaminetetraacetic acid (EDTA), of hexamethylene-1,6-diaminetetraacetic acid (HMDTA), of nitrilotriacetic acid (NTA), of ethylene glycol bis(2-aminoethyl ether)-N,N,N',N'-tetraacetic acid (EGTA), and more preferably still of nitrilotriphosphoric acid (NTPA, ATMP).

In order to optimize the efficacy of the aforementioned chelating agents, it is preferred to carry out adjustment to a pH optimized for the respective chelating agent. In particular it is advantageous to make the pH of the adhesive slightly acidic, preferably by adjustment to the pH range between 4 and 7, very preferably to pH=5.5 to 6.

Additives outstandingly suitable in accordance with the invention are, furthermore, ion exchange substances and/or molecular sieves; more particularly, zeolites and/or phyllosilicates.

Additives also very suitable in accordance with the invention for the adhesives are those substances which are used typically (particularly in water treatment) as precipitants for metal ions, more particularly alkaline earth metal ions, such as calcium(II) or magnesium(II) ions. Examples of outstandingly suitable such additives include phosphates, polyphosphates and/or phosphonates.

Exemplary outstanding additives from this group are trisodium phosphate, more preferably ammonium phosphate (more particularly ammonium dihydrogen phosphate and/or diammonium hydrogen phosphate), and also sodium polyphosphate.

It may further be very advantageous to use mixtures of two or more additives or mixtures of one or more additives with further substances, such as, for example, a mixture of sodium polyphosphate and alkylphosphonate.

The additives of the invention are added to the adhesive preferably in an amount up to 10% by weight, more preferably in an amount from 2% to 5% by weight. The additives are added to the adhesive preferably in a form in which the metal ion active (more particularly alkaline earth metal ion active) centres are present in "active" form, in other words in a form in which they are capable of binding the corresponding ions, and not in a form already wholly or partly saturated with these ions.

Adhesives used have been, in particular, (pressure-sensitive) adhesives containing vinyl-carboxylic acid, more particularly acrylic acid and/or methacrylic acid (the vinylcarboxylic acids are present in the pressure-sensitive adhesive more particularly in the form of copolymerized comonomers, but may also be present in a free form, especially as comonomer residues). The vinylcarboxylic acid fraction (more particularly acrylic acid fraction) in the pressure-sensitive adhesive may in particular amount to more than 20% by weight, or even to more than 50% by weight. Even for adhesives whose vinyl-carboxylic acid fraction (more particularly acrylic acid fraction) was more than 70% and even 80% by weight, the additization of the invention has proved to be very advantageous.

The invention further provides (pressure-sensitive) adhesive tapes with layers of the (pressure-sensitive) adhesive of the invention. The adhesive tapes of the invention may be in one-sidedly adhesive or double-sidedly adhesive configurations.

The adhesive tapes of the invention are more particularly those which are repulpable according to the TAPPI UM 213 measurement method (TAPPI Useful Methods 213, TAPPI 1991, ISBN 0898522064).

The invention further provides for the use of the adhesive tapes as described above for adhesively bonding filler-containing materials, more particularly materials containing calcium(II) and/or magnesium(II) ions. Emphasis may be given here more particularly to the use of the (pressure-sensitive) adhesive tapes of the invention for the adhesive bonding of $Ca^{2+}$- and/or $Mg^{2+}$-containing papers and/or of papers which have the aforementioned ions in the prime coat (primer).

The (pressure-sensitive) adhesive tapes of the invention can be used to outstanding effect in the paper industry in the context of flying splice, in order to join expiring paper webs to their new counterparts, and in a particularly favourable way can be used even in those cases where the problems depicted in this specification occur with alkaline earth metal ions, more particularly with calcium(II) ions.

The invention further provides a method of eliminating metal ions, more particularly alkaline earth metal ions, and especially calcium ions, from adhesives, especially from pressure-sensitive adhesives, by admixing the (pressure-sensitive) adhesive with additives that complex such metal ions and/or that form salts of low solubility with such metal ions.

Surprisingly it has emerged that, through the additization, the adhesive properties of the adhesives have not been impaired. In contrast, a person skilled in the art would have expected the trapping of the metal ions inwardly migrating into the adhesive from the substrate to be bonded (for example, the $Ca^{2+}$ ions inwardly migrating from a paper) to occur in the interface-side layer of the adhesive, and for the adhesive to be adhesively "deactivated", so to speak, as a result of the trapped ions accumulating at the interface, in the form, for example, of the compounds of low solubility formed. Unexpectedly, however, this was not found; instead, the adhesive retained its advantageous properties.

With the adhesive of the invention success has been achieved in producing repulpable adhesive tapes which can be used to bond even papers containing calcium carbonate as an inorganic constituent in the topcoat, more particularly even when calcium carbonate is the exclusive inorganic constituent or is present in the topcoat in very high fractions. The adhesive bonding of such a paper remains stable over long periods, which has not been previously successfully achieved with the adhesives of the prior art. It has been found that the additization of the adhesives stabilizes the original profile of properties at a high level over a prolonged application period.

Experiments

In laboratory experiments it has been shown that the additization of conventional pressure-sensitive adhesives, especially PSAs of high acrylic acid content (i.e. having a high fraction of acrylic acid in the comonomer composition for polymerizing the adhesive; investigated here using PSAs having acrylic acid fractions of 50% by weight or more), in a range up to 10% by weight of diammonium hydrogen phosphate had no significant influence on the bond strengths, demonstrated experimentally through the bond strengths to steel and to a label paper. The tack toes not increase until the top additization range of the mixing range specified above. Additization in an amount from 2% to 5% by weight has proved to be optimum, more particularly in the range of $3\pm1\%$ by weight. The elastic component (in %) when measuring the microshear travel, which represents a measure of the network density, remained at a good level. This test is used to test the shear strength of adhesive tapes under a temperature load of 40° C.

In long-term measurements of unadditized adhesives and adhesives blended with a weight fraction of 3% with diammonium hydrogen phosphate, the effect of ageing stabilization was investigated. This was done by applying samples of each of the stated adhesives to papers that contained calcium carbonate fractions of 5%, 10%, 15%, 50% and 100% by weight in their slip coat. The higher the fraction of calcium ions, the faster the ageing of the adhesives in terms of their adhesive properties (tack, bond strengths to steel and label paper, microshear travel determination, holding powers). Following additization with 3% by weight of diammonium hydrogen phosphate, the ageing behavior was significantly improved for papers of high calcium content. On measurements with calcium fractions of 5% and 10% by weight in the paper slip coat, it was in fact found, over a measurement of 40 days, that there were no significant deteriorations in the bond strengths.

Through the results of the long-term measurements, therefore, it has emerged that the additization of the invention provides a significant improvement in the storage stability of the pressure-sensitive adhesive in contact with materials containing (alkaline earth) metal ions, more particularly calcium ions, the bond strength and the tack remaining at a good level even over a relatively long period.

EXAMPLES

Example 1

Reference Composition 1

599 g of a 30% strength solution of a free-radically polymerized scaffold polymer consisting of 47% acrylic acid, 48% butyl acrylate and 5% vinyl caprolactam in a 1:1:1 mixture of water, isopropanol and acetone were blended with 397 g of polyoxy-ethylene(15)cocoamine (trade name Ethomeen C-25, Akzo; CAS No. 61791-14-8) and 0.70 g of the bisglycidyl ether of bisphenol A (bisphenol A epichlorohydrin Mw<700; trade name Epikote 828 LVEL, Hexion, CAS No. 25068-38-6).

The scaffold polymer is further characterized by a mass-average molar mass Mw of $9 \cdot 10^5$ g/mol and a polydispersity of 8.

Example 2

Reference Composition 2

2.1 Preparation of a Hydrophilic Scaffold Polymer

A vacuum-tight steel polymerization apparatus with a capacity of 2 l, fitted with reflux condenser, anchor stirrer, heating jacket and metering apparatus, is charged with 315 g of acrylic acid, 112.5 g of 2-ethylhexyl acrylate, 250 g of acetone, 100 g of ethanol and 100 g of water. Following evacuation, flushing with $N_2$ and heating to 62° C., a solution of 0.6 g of 2,2-azobis(2-methylbutyronitrile) in 6.4 g of acetone is introduced with stirring into the reaction medium, which boils at 600 hPa. The polymerization begins, with a slow fall in boiling temperature and an increase in viscosity. After a reaction time of 30 minutes, at 58° C., a further 0.5 g of 2,2-azobis(2-methylbutyronitrile) is supplied, in solution in a mixture of 75 g of acetone, 50 g of ethanol and 50 g of water, and the pressure is raised to 700 hPa. After a further 60 minutes and a further increase in viscosity, at 60° C., a further 75 g of acetone, 50 g of ethanol and 50 g of water are added, and the pressure is increased to 800 hPa. Further dilution is carried out after 120 minutes at 63° C. and approximately 1000 hPa (atmospheric pressure) with 75 g of acetone, 50 g of ethanol and 50 g of water. Under these conditions the polymerization is continued with boiling of the solution for 60 minutes. Thereafter, at 62° C. (atmospheric pressure), a solution of 22.5 g of SPA in 127.5 g of demineralised water is metered in simultaneously with a solution of 1.5 g of bis(4-tert-butylcyclohexyl) peroxydicarbonate in 13.5 g of acetone, the two additions taking place continuously to the boiling polymer solution, with distribution of the feeds over a period of 120 minutes. Thereafter the reaction is taken to its end at a reaction temperature of 62° C. and, after a total reaction time of 20 h, the batch is cooled to RT. During the entire time, any quantities of $O_2$ present are removed from the reaction mixture by drawing a weak stream of $N_2$ through it under suction. The polymer solution obtained is water-clear. The polymer content is 32.42% by weight. The relative viscosity, measured in absolute methanol at 25° C., is 3.363.

2.2 Preparation of a Repulpable Pressure-Sensitive Adhesive 92.54 g (30 g of polymer) of the polymer solution prepared in accordance with 1.1 are mixed with 67.25 g of an ethoxylated liquid primary coconut fatty amine. In the case of this plasticizing compound, the hydrogen atoms of the amino group have been substituted completely by ethoxy chains. The total number of ethoxy units per amine function is on average 15 (trade name Ethomeen C 25, Akzo). 0.05 g of the bisglycidyl ether of bisphenol A (trade name Epikote 828 LVEL, Hexion) in solution in 117 g of acetone is dispersed uniformly in the mixture, with stirring, and a clear, spreadable PSA solution is obtained by stirred introduction of 39 g of water.

Example 3

Reference Composition 3

3.1 Preparation of a Hydrophilic Scaffold Polymer

A vacuum-tight polymerization apparatus with a capacity of 2 l, corresponding to Example 1, is charged with 225 g of acrylic acid, 202.5 g of 2-ethylhexyl acrylate, 400 g of acetone and 50 g of ethanol. Following evacuation, flushing with nitrogen and heating to 62° C., a solution of 0.5 g of 2,2-azobis(2-methylbutyronitrile) in 8 g of acetone is introduced with stirring into the reaction medium, which boils at 650 hPa. The polymerization begins, with a slow fall in boiling temperature and an increase in viscosity of the reaction mixture. After a reaction time of 50 minutes, at 58° C., a further 0.5 g of 2,2-azobis(2-methylbutyronitrile) are added, in solution in 150.0 g of acetone and 25.0 g of ethanol. The polymerization is continued with the reaction mixture boiling at 60° C. and 800 hPa. After a further 100 minutes of reaction time, 150.0 g of acetone and 25 g of ethanol are added as diluents and the pressure is adjusted to atmospheric pressure. The polymerization is continued with boiling at 59° C.-60° C. for a further 180 minutes. Thereafter, at 60° C., a solution of 22.5 g SPA in 127.5 g of demineralised water is metered at the same time as a fine-particled dispersion of 4 g of bis(4-tert-butylcyclohexyl) peroxydicarbonate in 6 g of water, within a period of 120 minutes, the metered addition taking place into the boiling reaction mixture. The reaction is ended at 61° C. with a total reaction time of 20 hours. As in Example 1, an inert atmosphere is ensured in the reaction chamber during the polymerization. After cooling, the polymer solution is diluted with 175 g of demineralised water and 50 g of ethanol. The polymer content is 30.07% by weight; the relative viscosity, measured in 4.00:1.20 methanol/water at 25° C., is 2.500.

3.2 Preparation of a Pressure-sensitive Adhesive 94.8 g (28.5 g of polymer) of the polymer solution prepared in accordance with 3.1 are mixed with 60.4 g of the water-soluble plasticizer described in Example 2 under 2.2. This mixture is admixed with a solution of 8.0 g of a tackifier resin (unesterified rosin with an acid number in the region of 170) in 66.7 g of acetone. Prior to coating, a solution of 0.094 g of the bisglycidyl ether of bisphenol A (trade name Epikote 828 LVEL, Hexion) in 10 g of acetone is dispersed uniformly in the mixture.

Example 4

Inventive Composition 1 (Base Polymer from Example 1 with Additive)

The composition described in Example 1 is additionally blended with 17.3 g of diammonium hydrogen phosphate.

Example 5

Inventive Composition 2 (Base Polymer from Example 1 with Additive)

The composition described in Example 1 is additionally blended with 17.3 g of a commercially available preparation of sodium polyphosphate and alkylphosphonate with a high complexing action (trade name Kappafos D11, manufacturer: Kapp-Chemie, calcium-binding capacity of 120 mg CaO/g according to manufacturer).

Example 6

Inventive Composition 3 (base Polymer from Example 2 with Additive)

The composition described in Example 2.2 is additionally blended with 2.92 g of diammonium hydrogen phosphate.

Example 7

Inventive Composition 4 (Base Polymer from Example 2 with Additive)

The composition described in Example 2.2 is additionally blended with 2.92 g of Kappafos D11.

Example 8

Inventive Composition 5 (Base Polymer from Example 3 with Additive)

The composition described in Example 3.2 is additionally blended with 0.855 g of diammonium hydrogen phosphate.

Example 9

Inventive Composition 6 (Base Polymer from Example 3 with Additive)

The composition described in Example 3.2 is additionally blended with 0.855 g of Kappafos D11.

Measurements

The pressure-sensitive adhesives prepared in Examples 1-9, in the form of 30% strength solution in a 1:1:1 mixture of water, isopropanol and acetone, were coated onto siliconized release paper. After 120-minute conditioning at room temperature the swatch specimens were dried at 100° C. for 20 minutes. The coatweight after drying was 40 g/m². These specimens were laminated to paper containing calcium carbonate. The investigations were carried out using a paper from the company Drewsen SPEZIALPAPIERE GmbH & Co. KG, with the trade name "PRODURA Basispapier mit hoher Spaltfestigkeit" [PRODURA base paper with high split resistance]. Adhesive investigation took place in each case both on fresh specimens (instantaneous measurement) and on specimens which had been stored in a controlled-climate cabinet at 40° C. and 80% relative humidity (4-week measurement). Prior to the investigations the specimens were each conditioned for 3 days at 23° C. and 50% relative humidity.

Bond Strength Test (Test A)

The bond strength was determined as follows:

As a defined adhesion substrate, a label paper treated to make it pressure-sensitive adhesive on one side was mounted by its adhesive side onto a steel plate. As the sample for investigation, a strip of the above-described specimens 20 mm wide was pressed under load (2 kg) onto the adhesion substrate. Immediately thereafter the adhesive tape was peeled from the adhesion substrate at a rate of 300 mm/min and at an angle of 180°, and a measurement was made of the force required to achieve this at room temperature. The measurement value (in N/cm) was obtained as an average value from three individual measurements.

Microshear Travel Test (Test B)

This test is used to test the shear strength of adhesive tapes under a temperature load of 40° C.

Sample Preparation:

As the sample for investigation, a strip of the above-described specimens was adhered to a polished steel test plate cleaned with acetone and amenable to temperature conditioning, and was then rolled on six times using a 2 kg steel roller and a speed of 10 m/min. The bond area of the sample was 13 mm×10 mm [height×width]; the sample was suspended vertically, overhung the steel test plate by 2 mm at the top edge, and was reinforced flush with a stable adhesive strip which served as a support for the travel gauge.

Measurement:

The sample for measurement was loaded at the bottom end with a 100 g weight. The steel test plate bearing the adhered sample was temperature-conditioned to 40° C. The travel gauge was used to measure the deformation of the sample over a period of 15 minutes. Testing took place at an ambient temperature of 23±3° C. and a relative humidity of 50±5%.

Results

Repulpability

For all of Examples 1 to 9 it was found, with specimens produced specifically for the purpose as described above, that they are repulpable in accordance with the TAPPI measurement method UM 213.

Bond strengths, Shear Strength

Table 1 sets out the adhesive properties.

TABLE 1

| Method | BS (tesa Test A) [N/cm] | | Microshear travel (Test B) [μm] | |
|---|---|---|---|---|
| Storage | instantaneous | 4 weeks | instantaneous | 4 weeks |
| Ex. 1 | 3.3 | 0.8 | 91 | 19 |
| Ex. 2 | 3.1 | 1.5 | 195 | 19 |
| Ex. 3 | 3.1 | 1.2 | 186 | 27 |
| Ex. 4 | 3.2 | 3.3 | 95 | 87 |
| Ex. 5 | 3.2 | 3.1 | 101 | 93 |
| Ex. 6 | 3.3 | 3.3 | 176 | 158 |
| Ex. 7 | 3.2 | 3.4 | 181 | 159 |
| Ex. 8 | 3.4 | 3.3 | 195 | 208 |
| Ex. 9 | 3.0 | 3.1 | 212 | 178 |

BS: bond strength

Examples 1-3 indicate a significant loss of bond strength and a reduction in shear travel after storage at 40° C. and 80% relative humidity. For examples 4-9 it is clear that both the bond strength and the shear travel in the microshear travel test can be stabilized at a high level without impairing the initial values through addition of the additives.

The invention claimed is:

1. A pressure-sensitive adhesive formulation comprising copolymers of (meth)acrylic acid with esters of (meth)acrylic acid wherein the amount of (meth)acrylic acid in said copolymers amounts to more than 20% by weight, and additives capable of binding metal ions by chemical interaction, electrochemical interaction and/or physical interaction selected from the group consisting of polyphosphates, phosphonates, trisodium phosphate, ammonium phosphate and mixtures thereof.

2. Adhesive formulation according to claim 1, wherein said metal ions are alkaline earth metal ions.

3. Adhesive formulation according to claim 1, wherein the adhesive has a (meth)acrylic acid fraction of more that 30% by weight.

4. The adhesive formulation of claim 2, where said alkaline earth metal ions are calcium(II) ions and/or magnesium(II) ions.

5. The adhesive formulation of claim 1, wherein said additives are ammonium dihydrogen phosphate and/or diammonium hydrogen phosphate.

6. The adhesive formulation of claim 3, wherein said (meth)acrylic acid fraction is more than 50% by weight.

* * * * *